US011070383B2

(12) United States Patent
Wu et al.

(10) Patent No.: US 11,070,383 B2
(45) Date of Patent: Jul. 20, 2021

(54) RANDOM CODE GENERATOR

(71) Applicant: eMemory Technology Inc., Hsin-Chu (TW)

(72) Inventors: Meng-Yi Wu, Hsinchu County (TW); Hsin-Ming Chen, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 358 days.

(21) Appl. No.: 16/233,454

(22) Filed: Dec. 27, 2018

(65) Prior Publication Data

US 2019/0215168 A1    Jul. 11, 2019

Related U.S. Application Data

(60) Provisional application No. 62/659,150, filed on Apr. 18, 2018, provisional application No. 62/615,463, filed on Jan. 10, 2018.

(30) Foreign Application Priority Data

Nov. 23, 2018 (TW) ................. 107141885

(51) Int. Cl.
*H04L 9/32* (2006.01)
*G06F 21/71* (2013.01)
(Continued)

(52) U.S. Cl.
CPC ............ *H04L 9/3278* (2013.01); *G06F 21/71* (2013.01); *H04L 9/0662* (2013.01); *H04L 9/0866* (2013.01); *H04L 9/0894* (2013.01)

(58) Field of Classification Search
CPC ... H04L 9/3278; H04L 9/0662; H04L 9/0894; G06F 12/1408; G06F 12/1009; G06F 2212/2022; G06F 21/71
See application file for complete search history.

(56) References Cited

U.S. PATENT DOCUMENTS 5,943,283 A * 8/1999 Wong ................... G06F 12/1408
365/221
9,485,094 B1 11/2016 Parvarandeh et al.
(Continued)

FOREIGN PATENT DOCUMENTS

EP        3264673 A1      1/2018
JP      2011-257911      12/2011
(Continued)

OTHER PUBLICATIONS

Search report issued by EPO dated May 29 2019.
(Continued)

*Primary Examiner* — Carl G Colin
*Assistant Examiner* — Andrew Suh
(74) *Attorney, Agent, or Firm* — WPAT, PC (57) ABSTRACT

A random code generator includes an address Y decoder, an address X decoder, a PUF entropy pool, a processing circuit and an entropy key storage circuit. The address Y decoder includes plural Y control lines. The address Y decoder selectively activates the plural Y control lines according to a first address Y signal. The address X decoder includes plural X control lines. The address X decoder selectively activates the plural X control lines according to a first address X signal. The PUF entropy pool generates an output data according to the activated Y control lines and the activated X control lines. When the random code generator is in a normal working state, the processing circuit processes the output data into a random code according to at least one entropy key from the entropy key storage circuit.

19 Claims, 8 Drawing Sheets

(51) Int. Cl.
*H04L 9/06* (2006.01)
*H04L 9/08* (2006.01)

(56) References Cited

U.S. PATENT DOCUMENTS

| | | |
|---|---|---|
| 9,613,714 B1 | 4/2017 | Wong et al. |
| 2014/0037086 A1* | 2/2014 | Seol ................ H04L 9/0869 380/44 |
| 2016/0156476 A1* | 6/2016 | Lee .................. H04L 9/088 380/44 |
| 2018/0145838 A1* | 5/2018 | Wang ............... H04L 9/0866 |
| 2018/0176012 A1* | 6/2018 | Hung ............... G06F 12/1425 |
| 2020/0267341 A1* | 8/2020 | Baba ................ H04N 5/369 |

FOREIGN PATENT DOCUMENTS

| | | |
|---|---|---|
| JP | 2013-126221 | 6/2013 |
| JP | 2015-532549 | 11/2015 |
| JP | 2017-010530 | 1/2017 |
| WO | WO2014053286 A1 | 4/2014 |

OTHER PUBLICATIONS

Office action issued by TIPO dated Aug. 8, 2019.
Office action issued by JPO dated Jan. 21 2020.
Office Action issued by China National Intellectual Property Administration dated Sep. 3, 2020.

* cited by examiner

FIG. 8

US 11,070,383 B2

RANDOM CODE GENERATOR

This application claims the benefit of U.S. provisional application Ser. No. 62/615,463, filed Jan. 10, 2018, the benefit of U.S. provisional application Ser. No. 62/659,150, filed Apr. 18, 2018 and the benefit of Taiwan application Serial No. 107141885, filed Nov. 23, 2018, the subject matters of which are incorporated herein by reference.

FIELD OF THE INVENTION

The present invention relates to a random code generator, and more particularly to a random code generator with a physically unclonable function (PUF) cell array.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is equipped with a random code generator or mechanism for providing a random code. The random code is a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the PUF semiconductor chip is suitably used in the applications with high security requirements.

Moreover, U.S. Pat. No. 9,613,714 disclosed a PUF technology, corresponding PUF array and an associated random code generating method. Once the PUF cell array is randomized enrolled, the recorded contents are determined. Consequently, the enrolled PUF cell array is also referred as a PUF entropy pool.

However, the technicians in the art can use various methods to directly read the recorded contents of the enrolled PUF cell array (or the PUF entropy pool) to acquire the random code. After the contents of the random code are acquired, the unique identity code (ID code) of the semiconductor chip is realized. Under this circumstance, the confidential data in the semiconductor chip is possibly stolen.

SUMMARY OF THE INVENTION

An embodiment of the present invention provides a random code generator. The random code generator includes an address Y decoder, an address X decoder, a PUF entropy pool, a processing circuit and an entropy key storage circuit. The address Y decoder includes plural Y control lines. The address Y decoder selectively activates the plural Y control lines according to a first address Y signal. The address X decoder includes plural X control lines. The address X decoder selectively activates the plural X control lines according to a first address X signal. The PUF entropy pool is connected with the plural Y control lines and the plural X control lines. The PUF entropy pool generates an output data according to the activated Y control lines and the activated X control lines. The processing circuit is connected with the PUF entropy pool to receive the output data. The entropy key storage circuit is connected with the PUF entropy pool to receive plural entropy keys from the PUF entropy pool. When the random code generator is in a normal working state, the entropy key storage circuit provides at least one entropy key of the plural entropy keys to the processing circuit, and the processing circuit processes the output data into a random code according to the at least one entropy key.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
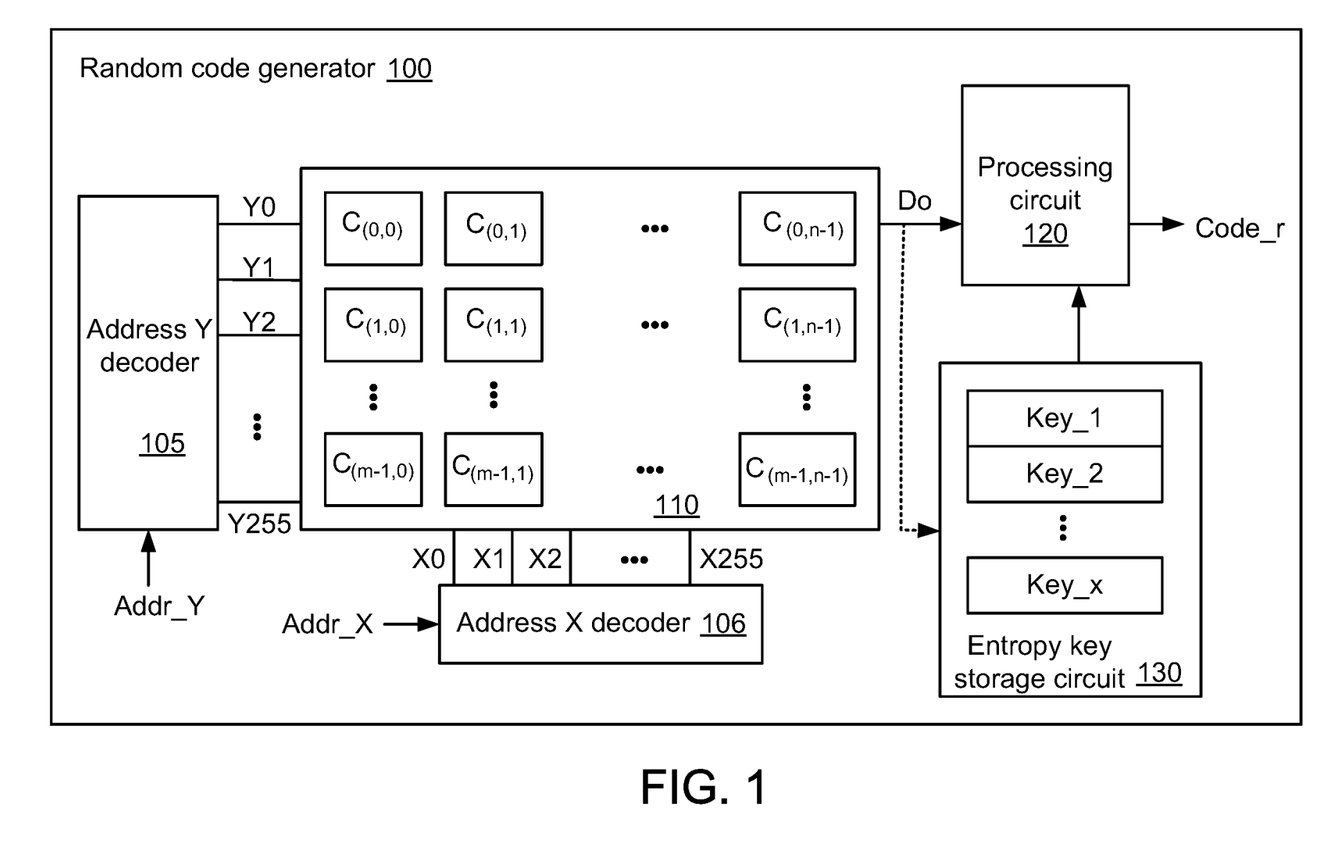
FIG. 1 is a schematic block diagram illustrating the architecture of a random code generator according to a first embodiment of the present invention.

FIG. 1 is a schematic block diagram illustrating the architecture of a random code generator according to a first embodiment of the present invention. The random code generator 100 comprises a PUF entropy pool 110, an address Y decoder 105, an address X decoder 106, an entropy key storage circuit 130 and a processing circuit 120. The PUF entropy pool 110 is a PUF cell comprising m×n PUF cells $C_{(0,0)}$~$C_{(m-1,n-1)}$. The PUF entropy pool 110 has a density of K entropies, wherein K=m×n. The entropy key storage circuit 130 has many implementation examples. For example, the entropy key storage circuit 130 comprises plural registers. In some other embodiments, the entropy key storage circuit 130 is integrated into the processing circuit 120.

For example, the PUF entropy pool 110 comprises 256× 256 PUF cells. That is, m=n=256. The address Y decoder 105 comprises 256 Y control lines Y0~Y255, which are connected with the PUF entropy pool 110. The address Y decoder 105 activates one of the 256 Y control lines Y0~Y255 according to an address Y signal Addr_Y. The address X decoder 106 comprises 256 X control lines X0~X255, which are connected with the PUF entropy pool 110. The address X decoder 106 activates one of the 256 X control lines X0~X255 according to an address X signal Addr_X.

Each of the address Y signal Addr_Y and the address X signal Addr_X contains 8 bits. According to the address Y signal Addr_Y and the address X signal Addr_X, any of the PUF cells in the PUF entropy pool 110 is selected. For example, in case that the address Y signal Addr_Y is "00000000" and the address X signal Addr_X is "00000000", the Y control line Y0 and the X control line X0 are activated. Meanwhile, the PUF cell $C_{(0,0)}$ in the PUF entropy pool 110 is selected. Consequently, the contents stored in the PUF cell $C_{(0,0)}$ are outputted from the PUF entropy pool 110 as the output data Do.

For outputting the 256-bit data in the zero-th row from the PUF entropy pool 110, the address Y signal Addr_Y is fixed as "00000000" and the address X signal Addr_X is increased from "00000000" to "11111111" sequentially. That is, the Y control line Y0 is activated, and the 256 X control lines X0~X255 are sequentially activated. Consequently, the contents stored in the zero-th row of the PUF cells $C_{(0,0)}$~$C_{(0,255)}$ of the PUF entropy pool 110 are outputted as the output data Do.

For outputting the first 128-bit data in the first row from the PUF entropy pool 110, the address Y signal Addr_Y is fixed as "00000001" and the address X signal Addr_X is increased from "00000000" to "01111111" sequentially. That is, the Y control line Y1 is activated, and the 128 X control lines X0~X127 are sequentially activated. Consequently, the contents stored in the first row of the PUF cells $C_{(1,0)}$~$C_{(1,127)}$ of the PUF entropy pool 110 are outputted as the output data Do.

As mentioned above, the PUF entropy pool 110 generates the output data Do according to the address Y signal Addr_Y and the address X signal Addr_X. The output data Do has at least 1 bit and at most 256×256 bits. Hereinafter, the output data Do with 256 bits will be taken as an example for illustration. It is noted that the example of the output data Do is not restricted.

Before the random code generator 100 is in a normal working state, an initialization process is performed. During the initialization process, the PUF entropy pool 110 provides plural entropy keys Key_1~Key_x to the entropy key storage circuit 130. For example, during the initialization process of the random code generator 100, a row of 256-bit data is outputted from the PUF entropy pool 110 to the entropy key storage circuit 130 and used as the first entropy key Key_1. Similarly, x rows of 256-bit data are outputted from the PUF entropy pool 110 to the entropy key storage circuit 130 and used as the entropy keys Key_1~Key_x.

When the random code generator 100 is in the normal working state, the entropy key storage circuit 130 provides at least one entropy key to the processing circuit 120. That is, when the random code generator 100 is in the normal working state, the output data Do from the PUF entropy pool 110 is inputted into the processing circuit 120. Moreover, the entropy key storage circuit 130 provides at least one entropy key to the processing circuit 120. According to the at least one entropy key, the processing circuit 120 processes the output data Do and generates a random code Code_r. Some examples of the processing circuit 120 will be illustrated with reference to FIGS. 2A~2E.

Figure 2A:
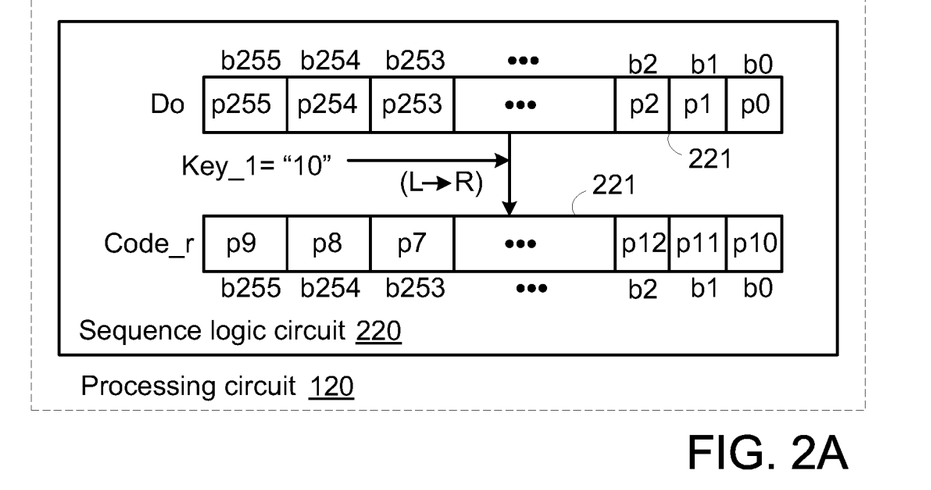
FIGS. 2A~2E schematically illustrate the operations of some exemplary processing circuits used in the random code generator of the present invention.

As shown in FIG. 2A, the processing circuit 120 comprises a sequence logic circuit 220. The sequence logic circuit 220 performs a sequence adjusting process in an asymmetric swapping manner. The sequence logic circuit 220 comprises a register 221. The register 221 is a circular shift register. That is, the bits in the register 221 are shifted from left to right (L→R).

The output data Do is received by and stored in the register 221. That is, the contents of the bits b255~b0 are p255~p0. Moreover, the register 221 receives the first entropy key Key_1. While the sequence logic circuit 220 performs the sequence adjusting process, the contents in the register 221 are shifted rightwards according to the value of the first entropy key Key_1. That is, the contents in the register 221 are shifted from left to right (L→R). After the sequence adjusting process is completed, the register 221 generates the random code Code_r.

For example, the value of the first entropy key Key_1 is "10". That is, the number of bits to be shifted rightwards is 10. After the sequence logic circuit 220 performs the sequence adjusting process, the content p9 of the bit b9 of the output data Do becomes the most significant bit (MSB) of the random code Code_r and the content p10 of the bit b10 of the output data Do becomes the least significant bit (LSB) of the random code Code_r.

Obviously, after the sequence adjusting process is completed, the random code Code_r generated by the sequence logic circuit 220 is different from the output data Do.

Figure 2B:
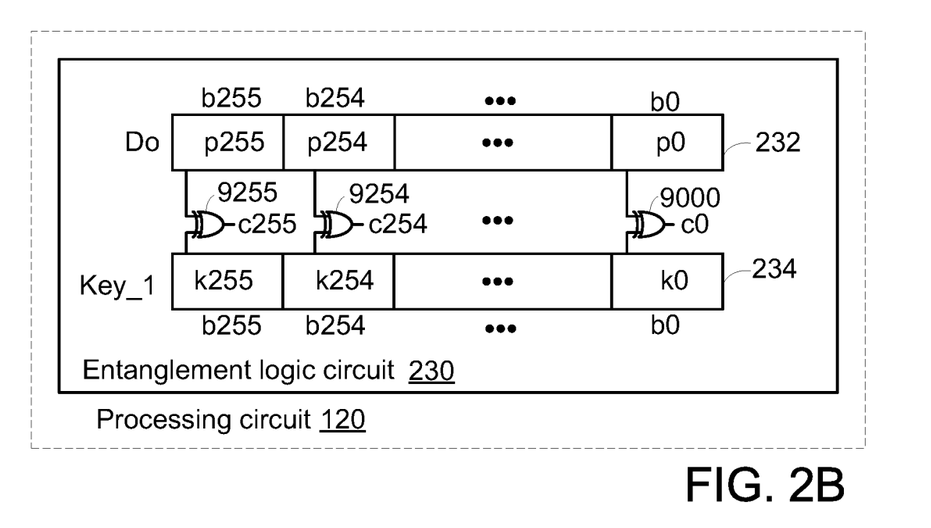

As shown in FIG. 2B, the processing circuit 120 comprises an entanglement logic circuit 230. The entanglement logic circuit 230 comprises two registers 232, 234 and plural XOR gates 9000~9255. After the entanglement logic circuit 230 performs an XOR operation on the output data Do and the first entropy key Key_1, the random code Code_r is generated.

For example, the register 232 receives the output data Do (i.e., p255~p0), and the register 234 receives the first entropy key Key_1 (i.e., k255~k0). After the XOR operation is performed on the content p0 of the bit b0 of the output data Do and the content k0 of the bit b0 of the first entropy key Key_1 by the XOR gate 9000, the content c0 of the bit b0 of the random code Code_r is generated. After the above process is repeatedly done, the other bits c255~c1 of the random code Code_r are generated.

Obviously, the random code Code_r generated by the entanglement logic circuit 230 is different from the output data Do.

Figure 2C:
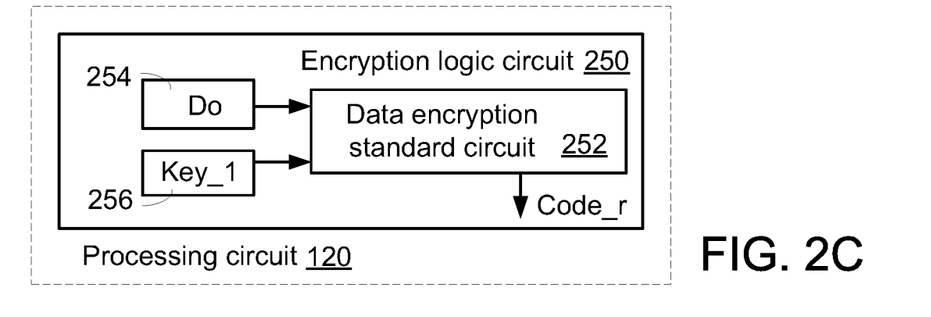

As shown in FIG. 2C, the processing circuit 120 comprises an encryption logic circuit 250. The encryption logic circuit 250 comprises two registers 254, 256 and a data encryption standard circuit (DES) 252.

The register 254 receives and stores the output data Do. The register 256 receives and stores the first entropy key Key_1. The data encryption standard circuit 252 receives the output data Do and the first entropy key Key_1. According to the DES standard, the data encryption standard circuit 252 performs an encryption process according to the output data Do and the first entropy key Key_1 and generates the random code Code_r.

Obviously, after the sequence adjusting process is completed, the random code Code_r generated by the encryption logic circuit 250 is different from the output data Do.

In some other embodiments, the processing circuit 120 comprises the combination of any two of the sequence logic circuit 220, the entanglement logic circuit 230 and the encryption logic circuit 250.

Figure 2D:
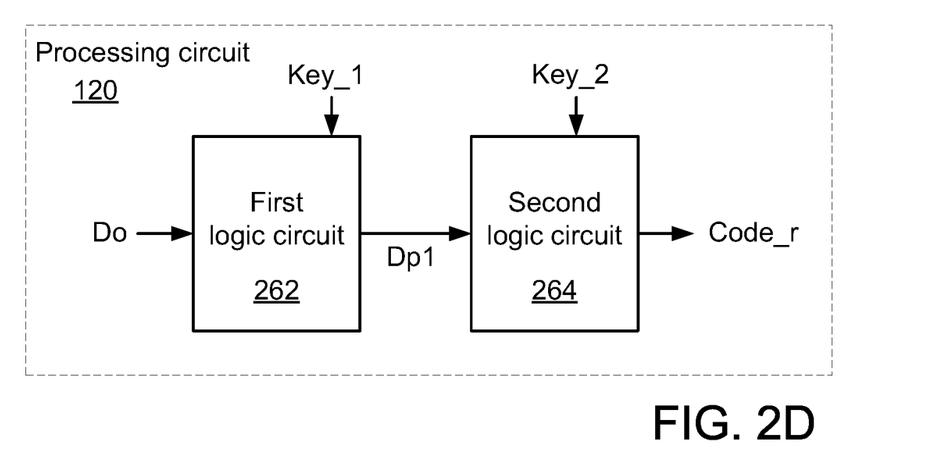

As shown in FIG. 2D, the processing circuit 120 comprises a first logic circuit 262 and a second logic circuit 264. The first logic circuit 262 receives the output data Do and the first entropy key Key_1, and generates a first processed data Dp1. The second logic circuit 264 receives the first processed data Dp1 and a second entropy key Key_2, and generates the random code Code_r.

In an embodiment, the first logic circuit 262 is the encryption logic circuit 250, and the second logic circuit 264 is the entanglement logic circuit 230. The first processed data Dp1 generated by the encryption logic circuit 250 is an encrypted data. The random code Code_r is generated by the entanglement logic circuit 230.

In another embodiment, the first logic circuit 262 is the entanglement logic circuit 230, and the second logic circuit 264 is the encryption logic circuit 250. In another embodiment, the first logic circuit 262 is the sequence logic circuit 220, and the second logic circuit 264 is the entanglement logic circuit 230. In another embodiment, the first logic circuit 262 is the entanglement logic circuit 230, and the second logic circuit 264 is the sequence logic circuit 220. In another embodiment, the first logic circuit 262 is the sequence logic circuit 220, and the second logic circuit 264 is the encryption logic circuit 250. In another embodiment, the first logic circuit 262 is the encryption logic circuit 250, and the second logic circuit 264 is the sequence logic circuit 220.

In some other embodiments, the processing circuit 120 comprises the combination of the sequence logic circuit 220, the entanglement logic circuit 230 and the encryption logic circuit 250.

Figure 2E:
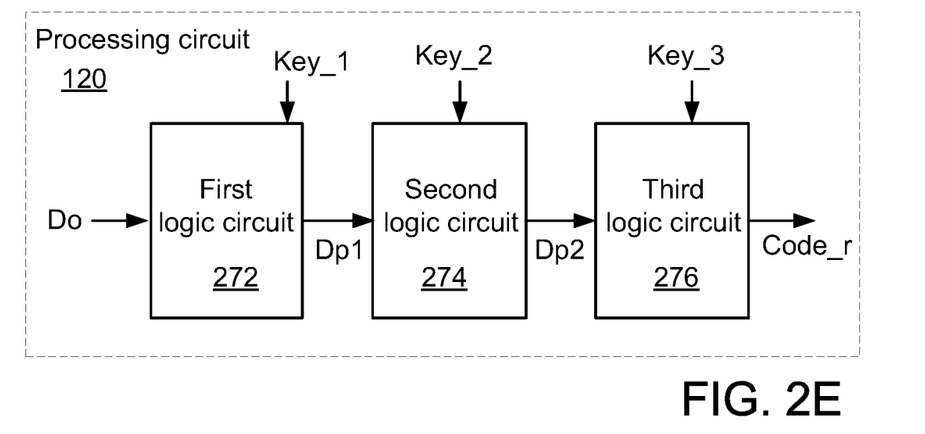

As shown in FIG. 2E, the processing circuit 120 comprises a first logic circuit 272, a second logic circuit 274 and a third logic circuit 276. The first logic circuit 272 receives the output data Do and the first entropy key Key_1, and generates a first processed data Dp1. The second logic circuit 274 receives the first processed data Dp1 and a second entropy key Key_2, and generates a second processed data Dp2. The third logic circuit 276 receives the second processed data Dp2 and a third entropy key Key_3, and generates the random code Code_r.

In an embodiment, the first logic circuit 272 is the sequence logic circuit 220, the second logic circuit 274 is the entanglement logic circuit 230, and the third logic circuit 276 is the encryption logic circuit 250. The first processed data Dp1 generated by the sequence logic circuit 220 is the sequence adjusted data. The second processed data Dp2 generated by the entanglement logic circuit 230 is the entangled data. The random code Code_r is generated by the encryption logic circuit 250.

As mentioned above, the PUF entropy pool 110 generates the output data Do according to the address Y signal Addr_Y and the address X signal Addr_X when the random code generator 100 is in the normal working state. The output data Do from the PUF entropy pool 110 is inputted into the processing circuit 120. Moreover, the entropy key storage circuit 130 provides the at least one entropy key to the processing circuit 120. According to the at least one entropy key, the processing circuit 120 processes the output data Do into the random code Code_r.

Moreover, as shown in FIG. 2A, the sequence logic circuit 220 can change the sequence of the bits of the output data Do. Moreover, the example of the sequence logic circuit 220 is not restricted. Some other examples of the sequence logic circuit will be illustrated as follows.

Figure 3A:
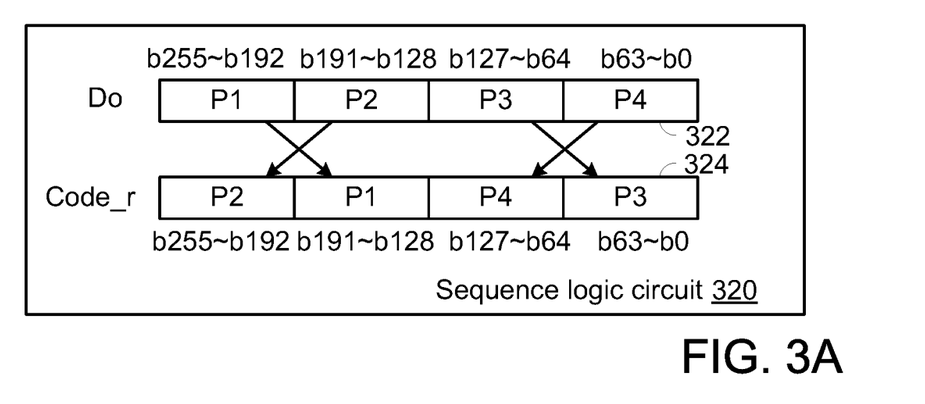
FIGS. 3A~3C schematically illustrate some other examples of the sequence logic circuit used in the random code generator of the present invention.
Figure 3B:
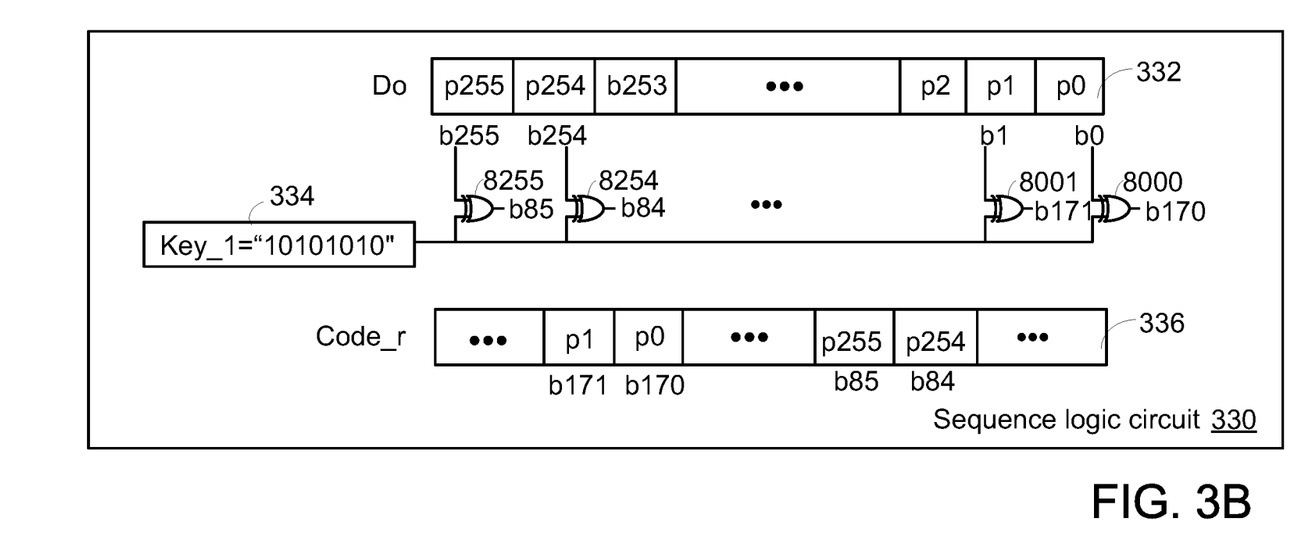
Figure 3C:
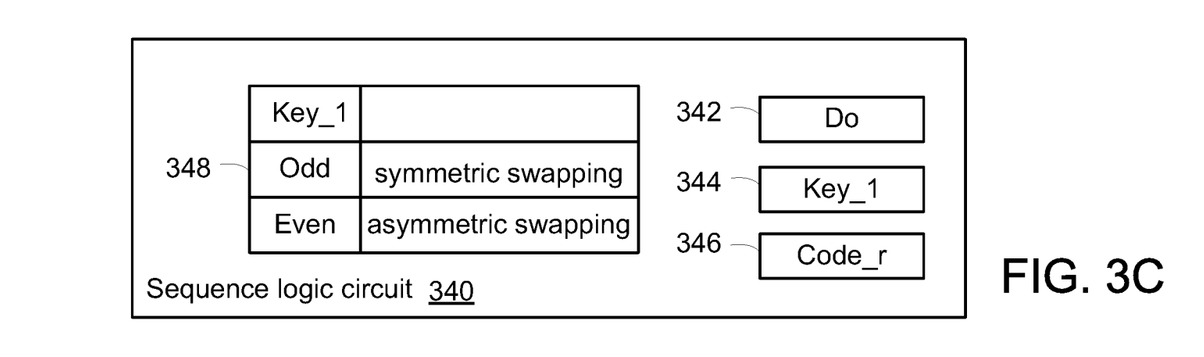

FIGS. 3A~3C schematically illustrate some other examples of the sequence logic circuit used in the random code generator of the present invention.

Please refer to FIG. 3A. The sequence logic circuit 320 performs a sequence adjusting process in a symmetric swapping manner. The sequence logic circuit 320 comprises two registers 322 and 324. The register 322 receives the 256-bit output data Do. The output data Do is divided into four parts P1~P4. The contents of the bits b255~b192 in the register 322 are the first part P1 of the output data Do. The contents of the bits b191~128 in the register 322 are the second part P2 of the output data Do. The contents of the bits b127~b64 in the register 322 are the third part P3 of the output data Do. The contents of the bits b63~b0 in the register 322 are the fourth part P4 of the output data Do.

While the sequence logic circuit 320 performs the sequence adjusting process, the first part P1 and the second part P2 are exchanged with each other and the third part P3 and the fourth part P4 are exchanged with each other. Consequently, the random code Code_r is generated and stored in the register 324. After the sequence adjusting process is completed, the contents of the bits b255~b192 in the register 324 are the second part P2 of the output data Do, contents of the bits b191~128 in the register 322 are the first part P1 of the output data Do, the contents of the bits b127~b64 in the register 322 are the fourth part P4 of the output data Do, and the contents of the bits b63~b0 in the register 322 are the third part P3 of the output data Do.

The examples of the sequence adjusting process are not restricted. That is, other examples of the sequence adjusting process in the symmetric swapping manner are feasible. For example, in another embodiment, the output data Do is also divided into the four parts P1~P4. While the sequence adjusting process is performed, the fourth part P4 and the first part P1 are exchanged with each other and the third part P3 and the second part P2 are exchanged with each other. Consequently, the random code Code_r is generated.

Please refer to FIG. 3B. The sequence logic circuit 330 performs a sequence adjusting process in a symmetric swapping manner. The sequence logic circuit 330 comprises three registers 332, 334, 336 and plural XOR gates 8000~8255. The register 332 receives the output data Do. The contents of the bits b255~b0 are p255~p0. The register 334 receives the first entropy key Key_1.

After an XOR operation is performed on a byte of the first entropy key Key_1 and the bits b255~b0 of the register 332, new bits are generated.

For example, a byte of the first entropy key Key_1 is "10101010". After the XOR operation is performed on the bit b255 ("11111111") and the key first entropy key Key_1 ("10101010"), the new bit is b85 ("01010101"). Consequently, the content of the bit b85 in the register 336 is p255. Similarly, after the XOR operation is performed on the bit b254 ("11111110") and the key first entropy key Key_1 ("10101010"), the new bit is b84 ("01010100"). Consequently, the content of the bit b84 in the register 336 is p254. Similarly, after the XOR operation is performed on the bit b1 ("00000001") and the key first entropy key Key_1 ("10101010"), the new bit is b171 ("01010100"). Consequently, the content of the bit b171 in the register 336 is p1. Similarly, after the XOR operation is performed on the bit b0 ("00000000") and the key first entropy key Key_1 ("10101010"), the new bit is b170 ("10101010"). Consequently, the content of the bit b170 in the register 336 is p0. The rest may be deduced by analogy.

Consequently, after the sequence adjusting process is completed, the content of the register 336 is the random code Code_r.

Please refer to FIG. 3C. The sequence logic circuit 340 performs a sequence adjusting process in both of the symmetric swapping manner and the asymmetric swapping manner. The sequence logic circuit 340 comprises three registers 342, 344, 346 and a look-up table 348. The register 342 receives the output data Do. The register 344 receives the first entropy key Key_1. The register 346 generates the random code Code_r. Moreover, the operation modes of the sequence logic circuit 340 are recorded in the look-up table 348.

According to the contents of the look-up table 348, the sequence logic circuit 340 performs the sequence adjusting process to generate the random code Code_r in the symmetric swapping manner (see FIG. 3A) when the value of the first entropy key Key_1 is odd. Whereas, the sequence logic circuit 340 performs the sequence adjusting process to generate the random code Code_r in the asymmetric swapping manner (see FIG. 2A or FIG. 3B) when the value of the first entropy key Key_1 is even.

It is noted that the number of operations modes of the sequence logic circuit 340 recorded in the look-up table 348 is not restricted to 2. That is, the contents of the look-up table 348 may contain more operation modes of the sequence logic circuit 340.

The entanglement logic circuit 230 as shown in FIG. 2B may be modified. Some other examples of the entanglement logic circuit will be described as follows.

FIGS. 4A~4D schematically illustrate some other examples of the entanglement logic circuit used in the random code generator of the present invention.

Figure 4A:
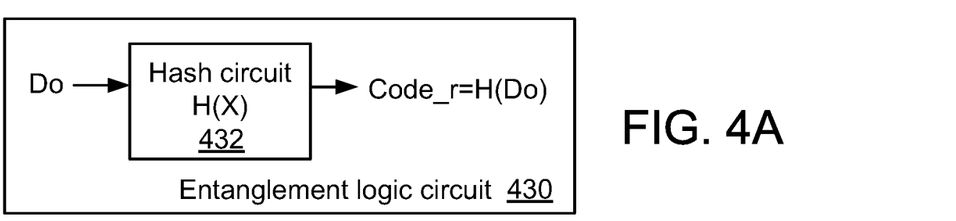
FIGS. 4A~4D schematically illustrate some other examples of the entanglement logic circuit used in the random code generator of the present invention.

As shown in FIG. 4A, the entanglement logic circuit 430 comprises a Hash circuit 432. The Hash circuit 432 performs the operation of a Hash function H(X). By the Hash function H(X), the data with an arbitrary size is mapped to a Hash value with a fixed size. For example, the Hash function is a SHA-256 Hash function. After the data with an arbitrary size is inputted into the SHA-256 Hash function, a 256-bit Hash value is generated. The 256-bit Hash value may be used as the random code Code_r.

As shown in FIG. 4A, the Hash circuit 432 receives the output data Do. After the Hash circuit 432 performs an Hash function operation on the output data Do, the 256-bit Hash value is generated and used as the random code Code_r. That is, the random code Code_r=H(Do).

Figure 4B:
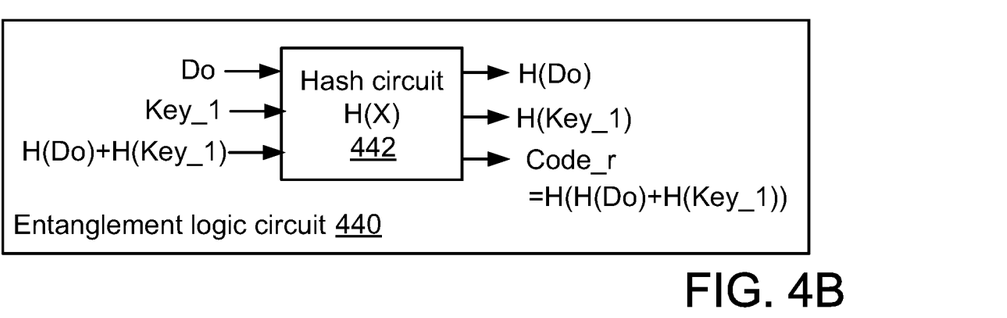

As shown in FIG. 4B, the entanglement logic circuit 440 comprises a Hash circuit 442. The Hash circuit 442 receives the output data Do and the first entropy key Key_1. After the Hash circuit 442 performs the Hash function operation on the output data Do and the first entropy key Key_1, a 256-bit first Hash value H(Do) and a 256-bit second Hash value H(Key_1) are generated.

Then, the first Hash value H(Do) and the second Hash value H(Key_1) are merged into a 512-bit merged data H(Do)+H(Key_1). Then, the 512-bit merged data H(Do)+H(Key_1) is received by the Hash circuit 442. After the Hash circuit 442 performs the Hash function operation on the merged data H(Do)+H(Key_1), a 256-bit third Hash value H(H(Do)+H(Key_1)) is generated and used as the random code Code_r. That is, the random code Code_r=H(H(Do)+H(Key_1)).

In a variant example of FIG. 4B, the entanglement logic circuit 440 receives the output data Do and more than one entropy key. For example, after the Hash circuit 442 performs the Hash function operation on the output data Do, the first entropy key Key_1, the second entropy key Key_2 and the third entropy key Key_3, a 1024-bit merged data is generated. After the Hash circuit 442 performs the Hash function operation on the 1024-bit merged data, a 256-bit Hash value is generated and used as the random code Code_r.

Figure 4C:
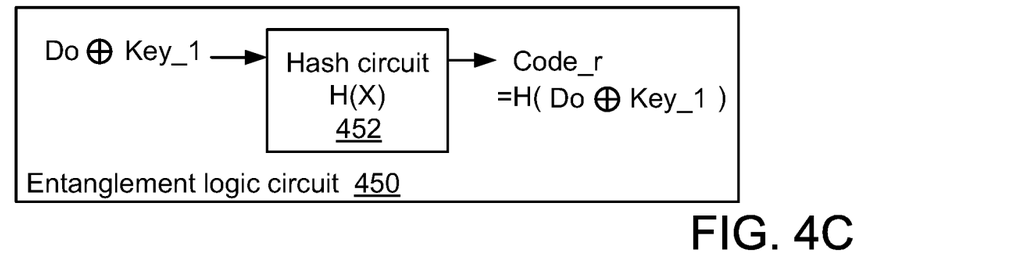

As shown in FIG. 4C, the entanglement logic circuit 450 comprises a Hash circuit 452. The Hash circuit 452 receives the output data Do and the first entropy key Key_1. After an XOR operation is performed on the output data Do and the first entropy key Key_1, a 256-bit operation data (Do⊕Key_1) is generated.

Then, the Hash circuit 452 receives the 256-bit operation data (Do⊕Key_1). After the Hash circuit 442 performs the Hash function operation on the 256-bit operation data (Do⊕Key_1), a 256-bit Hash value H(Do⊕Key_1) is generated and used as the random code Code_r. That is, the random code Code_r=H((Do⊕Key_1)).

In a variant example of FIG. 4C, the entanglement logic circuit 450 receives the output data Do and more than one entropy key. For example, the Hash circuit 452 performs the Hash function operation on the output data Do, the first entropy key Key_1, the second entropy key Key_2, the third entropy key Key_3 and the fourth entropy key Key_4. After an XOR operation is performed on the output data Do, the first entropy key Key_1, the second entropy key Key_2, the third entropy key Key_3 and the fourth entropy key Key_4, a 256-bit operation data is generated. After the Hash circuit 452 performs the Hash function operation on the 256-bit operation data, a 256-bit Hash value is generated and used as the random code Code_r.

Figure 4D:
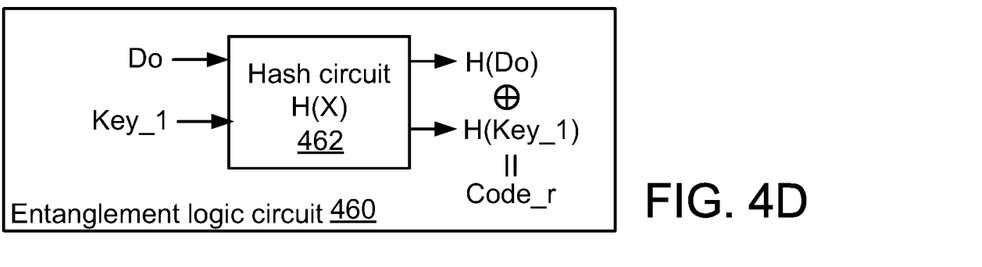

As shown in FIG. 4D, the entanglement logic circuit 460 comprises a Hash circuit 462. The Hash circuit 462 receives the output data Do and the first entropy key Key_1. After the Hash circuit 462 performs the Hash function operation on the output data Do and the first entropy key Key_1, a 256-bit first Hash value H(Do) and a 256-bit second Hash value H(Key_1) are generated.

After the entanglement logic circuit 460 performs an XOR operation on the first Hash value H(Do) and the second Hash value H(Key_1), a 256-bit random code Code_r is generated.

In a variant example of FIG. 4D, the entanglement logic circuit 460 receives the output data Do and more than one entropy key. For example, after the Hash circuit 462 performs the Hash function operation on the output data Do, the first entropy key Key_1, the second entropy key Key_2 and the third entropy key Key_3, respectively, four 256-bit Hash values are generated. Then, an XOR operation is performed on the four 256-bit Hash values. Consequently, a 256-bit random code Code_r is generated.

The encryption logic circuit 250 as shown in FIG. 2C may be modified. Some other examples of the encryption logic circuit will be described as follows.

Figure 5:
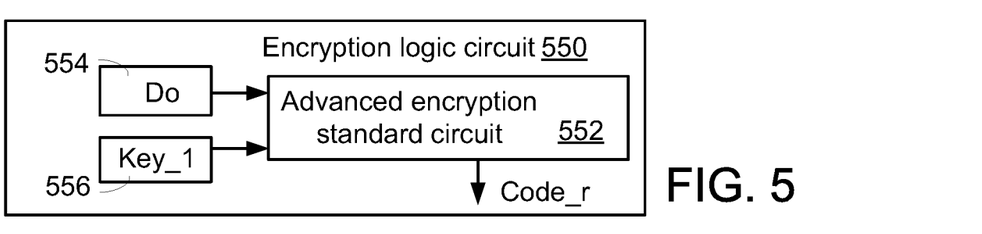
FIG. 5 schematically illustrates another example of the encryption logic circuit used in the random code generator of the present invention.

FIG. 5 schematically illustrates another example of the encryption logic circuit used in the random code generator of the present invention. The encryption logic circuit 450 comprises two registers 554, 556 and an advanced encryption standard circuit (AES) 552. The register 554 receives the output data Do. The register 556 receives the first entropy key Key_1. While the encryption logic circuit 550 performs the encryption process, the advanced encryption standard circuit 552 receives the output data Do and the first entropy key Key_1 and generates the random code Code_r.

From the above descriptions, the first embodiment of the present invention provides the random code generator 100. The address Y decoder 105 activates the 256 Y control lines Y0~Y255 according to the address Y signal Addr_Y. The address X decoder 106 activates the 256 X control lines X0~X255 according to the address X signal Addr_X.

In some other embodiments, the address Y signal Addr_Y and the address X signal Addr_X are subjected to a scramble action. In addition, the 256 Y control lines Y0~Y255 are activated according to the scrambled address Y signal, and the 256 X control lines X0~X255 are activated according to the scrambled address X signal.

Figure 6:
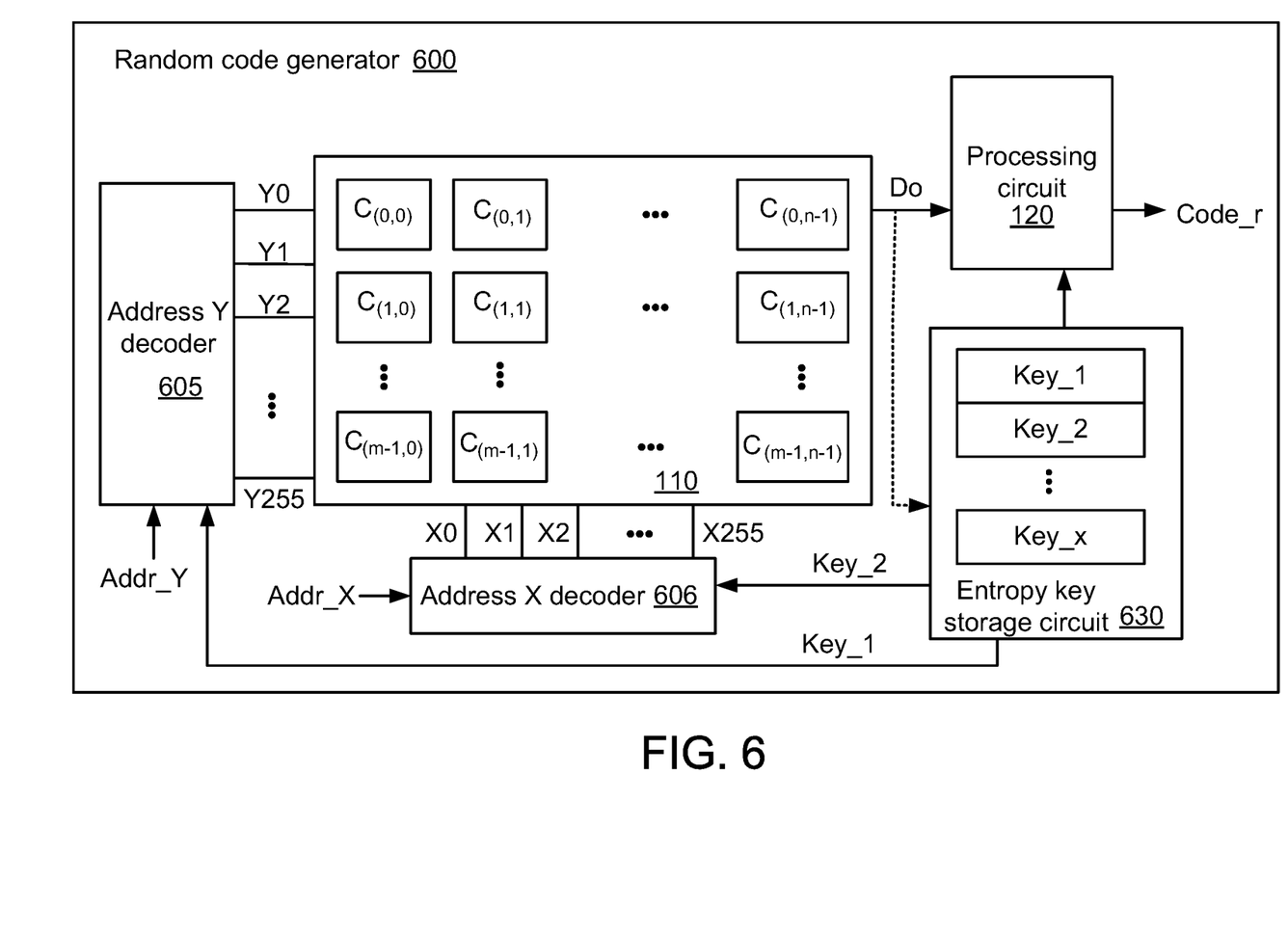
FIG. 6 is a schematic block diagram illustrating the architecture of a random code generator according to a second embodiment of the present invention.

FIG. 6 is a schematic block diagram illustrating the architecture of a random code generator according to a second embodiment of the present invention. The random code generator 600 comprises a PUF entropy pool 110, an address Y decoder 605, an address X decoder 606, an entropy key storage circuit 630 and a processing circuit 120. In comparison with the random code generator 100, the address Y decoder 605, the address X decoder 606 and the entropy key storage circuit 630 of the random code generator 600 are distinguished. For succinctness, only the relationships between the address Y decoder 605, the address X decoder 606 and the entropy key storage circuit 630 will be described as follows.

In this embodiment, the entropy key storage circuit 630 provides plural entropy keys to the processing circuit 120. Moreover, the entropy key storage circuit 630 further provides entropy keys to the address Y decoder 605 and the address X decoder 606. For example, the entropy key storage circuit 630 provides the first entropy key Key_1 to the address Y decoder 605 and provides the second entropy key Key_2 to the address X decoder 606.

Firstly, the address Y decoder 605 performs a scramble action on the address Y signal Addr_Y and the first entropy key Key_1, and thus a scrambled address Y signal is generated. The address Y decoder 605 activates the 256 Y control lines Y0~Y255 according to the scrambled address Y signal. Similarly, the address X decoder 606 performs a scramble action on the address X signal Addr_X and the second entropy key Key_2, and thus a scrambled address X signal is generated. The address X decoder 606 activates the 256 X control lines X0~X255 according to the scrambled address X signal. In an embodiment, the scramble action indicates the XOR operation on the address signal (i.e., the address Y signal or the address X signal) and the associated entropy key.

For example, the first entropy key Key_1 is "11001100", and the second entropy key Key_2 is "00111100". If the address Y signal Addr_Y received by the address Y decoder 605 is "01010101", the scrambled address Y signal is "10011001". That is, "11001100"⊕"01010101"="10011001". Consequently, the address Y decoder 605 activates the Y control line Y153.

Similarly, if the address X signal Addr_X received by the address X decoder 606 is "01010101", the scrambled address X signal is "01101001". That is, "00111100"⊕"01010101"="01101001". Consequently, the address X decoder 606 activates the X control line X105.

From the above descriptions, the second embodiment of the present invention provides the random code generator 600. The address Y signal Addr_Y and the address X signal Addr_X are scrambled according to the entropy keys from the entropy key storage circuit 630.

Figure 7:
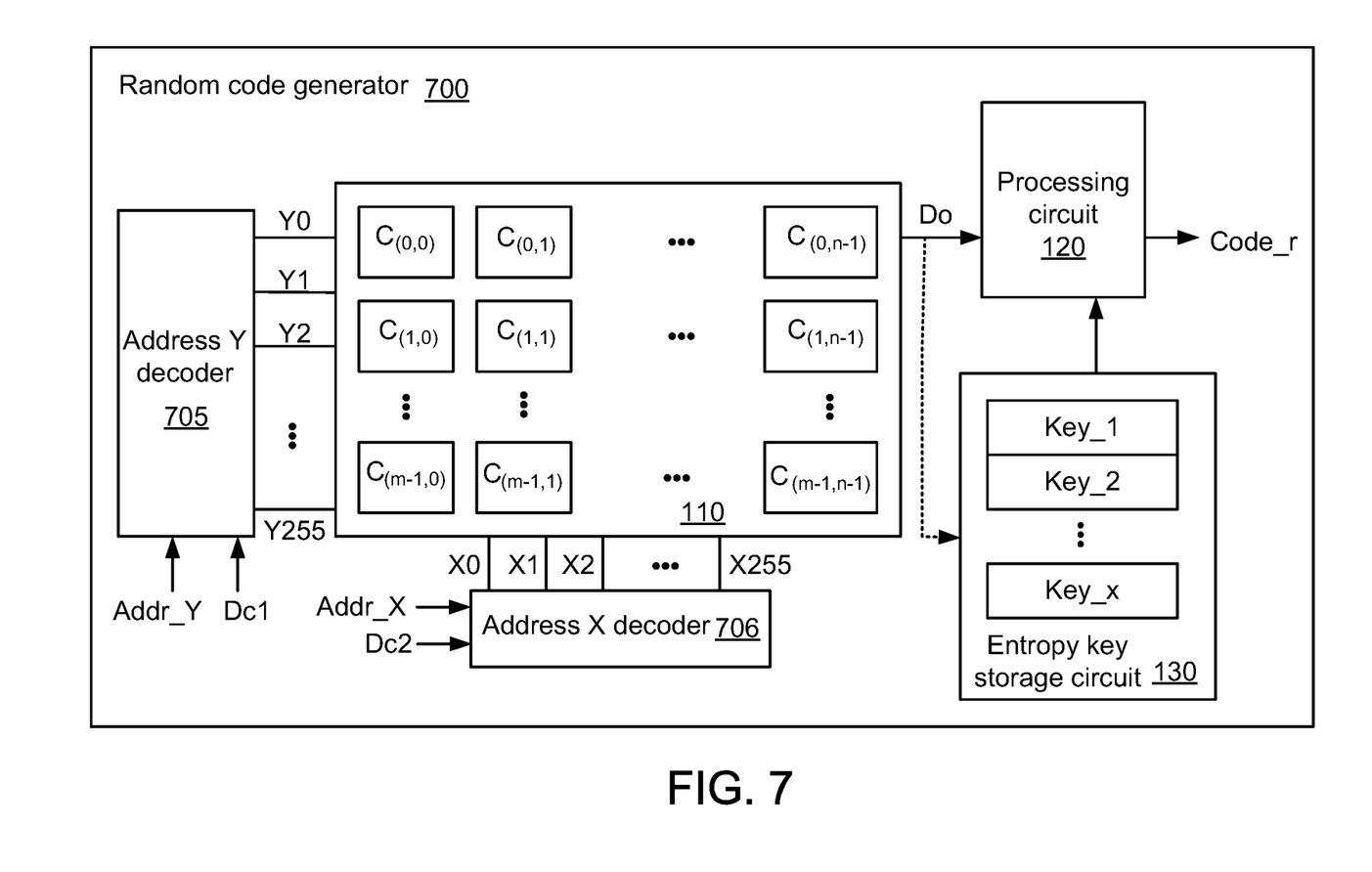
FIG. 7 is a schematic block diagram illustrating the architecture of a random code generator according to a third embodiment of the present invention.

FIG. 7 is a schematic block diagram illustrating the architecture of a random code generator according to a third embodiment of the present invention. The random code generator 700 comprises a PUF entropy pool 110, an address Y decoder 705, an address X decoder 706, an entropy key storage circuit 130 and a processing circuit 120. In comparison with the random code generator 100, the address Y decoder 705 and the address X decoder 706 of the random code generator 700 are distinguished. For succinctness, only the relationship between the address Y decoder 705 and the address X decoder 706 will be described as follows.

In this embodiment, the address Y decoder 705 receives the address Y signal Addr_Y and a first challenging signal Dc1, and the address X decoder 706 receives the address X signal Addr_X and a second challenging signal Dc2. The first challenging signal Dc1 and the second challenging signal Dc2 are provided by an external device outside the random code generator 700.

Firstly, the address Y decoder 705 performs a scramble action on the address Y signal Addr_Y and the first challenging signal Dc1, and thus a scrambled address Y signal is generated. The address Y decoder 705 activates the 256 Y control lines Y0~Y255 according to the scrambled address Y signal. Similarly, the address X decoder 706 performs a scramble action on the address X signal Addr_X and the second challenging signal Dc2, and thus a scrambled address X signal is generated. The address X decoder 706 activates the 256 X control lines X0~X255 according to the scrambled address X signal. In an embodiment, the scramble action indicates the XOR operation on the address signal (i.e., the address Y signal or the address X signal) and the associated challenging signal.

Figure 8:
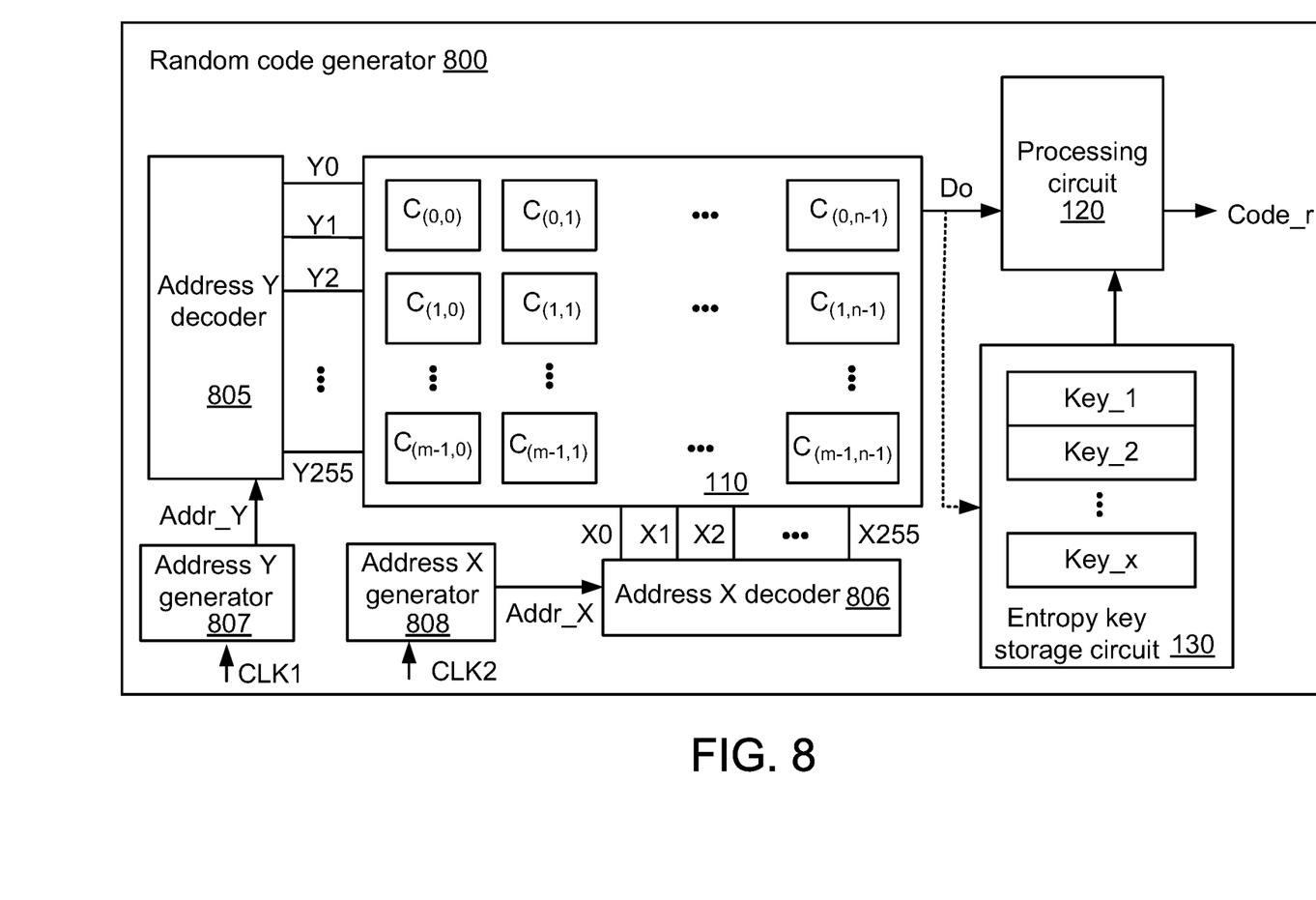
FIG. 8 is a schematic block diagram illustrating the architecture of a random code generator according to a fourth embodiment of the present invention.

Moreover, the random code generator is capable of generating a random code stream. FIG. 8 is a schematic block diagram illustrating the architecture of a random code generator according to a fourth embodiment of the present invention. The random code generator 800 comprises a PUF entropy pool 110, an address Y decoder 805, an address Y generator 807, an address X decoder 806, an address X generator 808, an entropy key storage circuit 130 and a processing circuit 120. In comparison with the random code generator 100, the address Y decoder 805, the address Y generator 807, the address X decoder 806 and the address X generator 808 of the random code generator 800 are distinguished. For succinctness, only the relationships between the address Y decoder 805, the address Y generator 807, the address X decoder 806 and the address X generator 808 will be described as follows.

In this embodiment, the address Y generator 807 receives a clock signal CLK1 and generates the address Y signal Addr_Y to the address Y decoder 805. The address X generator 808 receives a clock signal CLK2 and generates the address X signal Addr_X to the address X decoder 806. The address Y generator 807 continuously generates the address Y signal Addr_Y according to the clock signal CLK1. The address X generator 808 continuously generates the address X signal Addr_X according to the clock signal CLK2.

In an embodiment, the address Y generator 807 and the address X generator 808 are linear feedback shift registers (LFSR). Consequently, the address Y generator 807 generates the random address Y signal Addr_Y, and the address X generator 808 generates the random address X signal Addr_X. Consequently, the processing circuit 120 generates the random code stream according to the changes of the clock signal CLK1 and the clock signal CLK2.

In another embodiment, the address Y generator 807 and the address X generator 808 are deterministic random bit generators (DRBG). Consequently, the address Y generator 807 generates the random address Y signal Addr_Y, and the address X generator 808 generates the random address X signal Addr_X.

From the above descriptions, the present invention provides a random code generator. The output data Do from the PUF entropy pool 110 is processed into the random code Code_r by the processing circuit 120. Since the output data Do from the PUF entropy pool 110 is not used as the random code, the random code is not easily cracked. Consequently, the PUF semiconductor chip is suitably used in the applications with high security requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generator, comprising:
   an address Y decoder comprising plural Y control lines, wherein the address Y decoder selectively activates the plural Y control lines according to a first address Y signal;
   an address X decoder comprising plural X control lines, wherein the address X decoder selectively activates the plural X control lines according to a first address X signal;
   a physically unclonable function entropy pool connected with the plural Y control lines and the plural X control lines, wherein the physically unclonable function entropy pool generates an output data according to the activated Y control lines and the activated X control lines;
   a processing circuit connected with the physically unclonable function entropy pool to receive the output data; and
   an entropy key storage circuit connected with the physically unclonable function entropy pool to receive plural entropy keys from the physically unclonable function entropy pool,
   wherein when the random code generator is in a normal working state, the entropy key storage circuit provides at least one entropy key of the plural entropy keys to the processing circuit, and the processing circuit processes the output data into a random code according to the at least one entropy key;
   wherein the address Y decoder and the address X decoder are connected with the entropy key storage circuit to receive a first entropy key and a second entropy key of the plural entropy keys from the entropy key storage circuit, wherein after the address Y decoder performs a scramble action on a second address Y signal and the first entropy key, the first address Y signal is generated, wherein after the address X decoder performs the scramble action on a second address X signal and the second entropy key, the first address X signal is generated.

2. The random code generator as claimed in claim 1, wherein during an initialization process of the random code generator, the physically unclonable function entropy pool provides the plural entropy keys to the entropy key storage circuit.

3. The random code generator as claimed in claim 1, wherein the processing circuit comprises a sequence logic circuit, wherein the sequence logic circuit receives the output data and a third entropy key of the plural entropy keys and generates a sequence adjusted data.

4. The random code generator as claimed in claim 3, wherein the processing circuit further comprises an entanglement logic circuit, wherein the entanglement logic circuit receives the sequence adjusted data and a fourth entropy key of the plural entropy keys and generates an entangled data.

5. The random code generator as claimed in claim 4, wherein the processing circuit further comprises an encryption logic circuit, wherein the encryption logic circuit receives the entangled data and a fifth entropy key of the plural entropy keys and generates an encrypted data, wherein the encrypted data is the random code.

6. The random code generator as claimed in claim 3, wherein the processing circuit further comprises an encryption logic circuit, wherein the encryption logic circuit receives the sequence adjusted data and a fourth entropy key of the plural entropy keys and generates an encrypted data.

7. The random code generator as claimed in claim 6, wherein the processing circuit further comprises an entanglement logic circuit, wherein the entanglement logic circuit receives the encrypted data and a fifth entropy key of the plural entropy keys and generates an entangled data, wherein the entangled data is the random code.

8. The random code generator as claimed in claim 1, wherein the processing circuit comprises an entanglement logic circuit, wherein the entanglement logic circuit receives the output data and a third entropy key of the plural entropy keys and generates an entangled data.

9. The random code generator as claimed in claim 8, wherein the processing circuit further comprises a sequence logic circuit, wherein the sequence logic circuit receives the entangled data and a fourth entropy key of the plural entropy keys and generates a sequence adjusted data.

10. The random code generator as claimed in claim 9, wherein the processing circuit further comprises an encryption logic circuit, wherein the encryption logic circuit receives the sequence adjusted data and a fifth entropy key of the plural entropy keys and generates an encrypted data, wherein the encrypted data is the random code.

11. The random code generator as claimed in claim 8, wherein the processing circuit further comprises an encryption logic circuit, wherein the encryption logic circuit receives the entangled data and a fourth entropy key of the plural entropy keys and generates an encrypted data.

12. The random code generator as claimed in claim 11, wherein the processing circuit further comprises a sequence logic circuit, wherein the sequence logic circuit receives the encrypted data and a fifth entropy key of the plural entropy keys and generates a sequence adjusted data, wherein the sequence adjusted data is the random code.

13. The random code generator as claimed in claim 1, wherein the processing circuit further comprises an encryption logic circuit, wherein the encryption logic circuit receives the output data and a third entropy key of the plural entropy keys and generates an encrypted data.

14. The random code generator as claimed in claim 13, wherein the processing circuit further comprises a sequence logic circuit, wherein the sequence logic circuit receives the encrypted data and a fourth entropy key of the plural entropy keys and generates a sequence adjusted data.

15. The random code generator as claimed in claim 14, wherein the processing circuit further comprises an entanglement logic circuit, wherein the entanglement logic circuit receives the sequence adjusted data and a fifth entropy key of the plural entropy keys and generates an entangled data, wherein the entangled data is the random code.

16. The random code generator as claimed in claim 13, wherein the processing circuit further comprises an entanglement logic circuit, wherein the entanglement logic circuit receives the encrypted data and a fourth entropy key of the plural entropy keys and generates an entangled data.

17. The random code generator as claimed in claim 16, wherein the processing circuit further comprises a sequence logic circuit, wherein the sequence logic circuit receives the entangled data and a fifth entropy key of the plural entropy keys and generates a sequence adjusted data, wherein the sequence adjusted data is the random code.

18. A random code generator, comprising:
- an address Y decoder comprising plural Y control lines, wherein the address Y decoder selectively activates the plural Y control lines according to a first address Y signal;
- an address X decoder comprising plural X control lines, wherein the address X decoder selectively activates the plural X control lines according to a first address X signal;
- a physically unclonable function entropy pool connected with the plural Y control lines and the plural X control lines, wherein the physically unclonable function entropy pool generates an output data according to the activated Y control lines and the activated X control lines;
- a processing circuit connected with the physically unclonable function entropy pool to receive the output data; and
- an entropy key storage circuit connected with the physically unclonable function entropy pool to receive plural entropy keys from the physically unclonable function entropy pool,
- wherein when the random code generator is in a normal working state, the entropy key storage circuit provides at least one entropy key of the plural entropy keys to the processing circuit, and the processing circuit processes the output data into a random code according to the at least one entropy key;
- wherein after the address Y decoder performs a scramble action on a second address Y signal and a first challenging signal, the first address Y signal is generated,
- wherein after the address X decoder performs the scramble action on a second address X signal and a second challenging signal, the first address X signal is generated.

19. A random code generator, comprising:
- an address Y decoder comprising plural Y control lines, wherein the address Y decoder selectively activates the plural Y control lines according to a first address Y signal;
- an address X decoder comprising plural X control lines, wherein the address X decoder selectively activates the plural X control lines according to a first address X signal;
- a physically unclonable function entropy pool connected with the plural Y control lines and the plural X control lines, wherein the physically unclonable function entropy pool generates an output data according to the activated Y control lines and the activated X control lines;
- a processing circuit connected with the physically unclonable function entropy pool to receive the output data; and
- an entropy key storage circuit connected with the physically unclonable function entropy pool to receive plural entropy keys from the physically unclonable function entropy pool,
- wherein when the random code generator is in a normal working state, the entropy key storage circuit provides at least one entropy key of the plural entropy keys to the processing circuit, and the processing circuit processes the output data into a random code according to the at least one entropy key;
- wherein the address Y decoder is connected with an address Y generator to receive the first address Y signal from the address Y generator, and the address X decoder is connected with an address X generator to receive the first address X signal from the address X generator, wherein the address Y generator and the address X decoder are deterministic random bit generators or linear feedback shift registers.

* * * * *